United States Patent
Ash et al.

(10) Patent No.: US 10,686,401 B2
(45) Date of Patent: Jun. 16, 2020

(54) APPARATUS FOR SECURING AND COVERING A CLAMPING DEVICE FOR SOLAR PANEL MODULES

(71) Applicant: Ironridge, Inc., Hayward, CA (US)

(72) Inventors: Jon Ash, Phoenix, AZ (US); David Briggs, Oakland, CA (US); Shawn Meine, Phoenix, AZ (US); Bryan Lester, Phoenix, AZ (US)

(73) Assignee: Ironridge, Inc., Hayward, CA (US)

( * ) Notice: Subject to any disclaimer, the term of this patent is extended or adjusted under 35 U.S.C. 154(b) by 634 days.

(21) Appl. No.: 15/360,908

(22) Filed: Nov. 23, 2016

(65) Prior Publication Data

US 2017/0085219 A1 Mar. 23, 2017

Related U.S. Application Data

(63) Continuation-in-part of application No. 14/796,016, filed on Jul. 10, 2015, now Pat. No. 10,186,791, and
(Continued)

(51) Int. Cl.
*H02S 20/23* (2014.01)
*F24S 25/636* (2018.01)
(Continued)

(52) U.S. Cl.
CPC ............. *H02S 40/34* (2014.12); *F16B 2/12* (2013.01); *F16B 7/187* (2013.01); *H01R 4/305* (2013.01);
(Continued)

(58) Field of Classification Search
CPC .. H01R 4/64; H01R 4/305; H01R 9/18; F16B 2/12; F16B 7/187; F16B 19/02; F16B 37/0814; F16B 43/00; F16B 43/005; F16B 7/0493; F16B 7/044; F16B 7/048; F24J 2/5245; F24J 2/5249; F24J 2/5258; H02S 20/23; H02S 20/24; H02S 20/22; F24S 25/60; F24S 25/636; F24S 25/634; F24S 25/65; F24S 25/63; F24S 2025/6003;
(Continued)

(56) References Cited

U.S. PATENT DOCUMENTS 2,632,479 A 3/1953 Pfeil et al.
3,854,371 A 12/1974 Lamothe
(Continued)

FOREIGN PATENT DOCUMENTS

DE 10 2006 025 036 * 4/2008 ............... F16B 5/02
EP 0819087 1/2000
(Continued)

*Primary Examiner* — Michael P Ferguson
(74) *Attorney, Agent, or Firm* — Lance C. Venable; Law Office of Lance C. Venable

(57) ABSTRACT

The present invention is directed to a covering for a clamping assembly used to connect and ground solar panel modules to a mounting rail. The covering comprises a sleeve including an outer cover for connecting to the solar panel module and a connector shaped to be contained within the outer cover and connected to the outer cover through two or more flanges. The connector has an opening there through to receive a female member of the clamping assembly.

4 Claims, 4 Drawing Sheets

Related U.S. Application Data a continuation-in-part of application No. 13/542,570, filed on Jul. 5, 2012, now Pat. No. 9,689,411.

(60) Provisional application No. 62/259,607, filed on Nov. 24, 2015.

(51) Int. Cl.

| | | |
|---|---|---|
| *H02S 40/34* | (2014.01) | |
| *H02S 30/10* | (2014.01) | |
| *H01R 4/30* | (2006.01) | |
| *F16B 7/18* | (2006.01) | |
| *F16B 2/12* | (2006.01) | |
| *H01R 4/64* | (2006.01) | |
| *F16B 43/00* | (2006.01) | |

(52) U.S. Cl.
CPC ............... *H01R 4/64* (2013.01); *H02S 30/10* (2014.12); *F16B 43/00* (2013.01)

(58) Field of Classification Search
CPC ....... F24S 2025/6005; F24S 2025/6006; F24S 2025/6004
USPC .......................................... 411/108
See application file for complete search history.

(56) References Cited

U.S. PATENT DOCUMENTS

| | | | |
|---|---|---|---|
| 4,581,481 A | 4/1986 | Moretti | |
| 5,160,105 A | 11/1992 | Miller | |
| 6,585,465 B1 * | 7/2003 | Hammond | B60P 7/0815 |
| | | | 410/104 |
| 8,505,864 B1 | 8/2013 | Tayler et al. | |
| 8,657,545 B2 * | 2/2014 | Magno, Jr. | F16B 7/187 |
| | | | 248/214 |
| 8,740,163 B1 | 6/2014 | Tayler et al. | |
| 9,097,443 B2 | 8/2015 | Liu et al. | |
| 9,985,575 B2 * | 5/2018 | Stearns | H02S 20/23 |
| 2011/0214365 A1 * | 9/2011 | Aftanas | F24S 25/636 |
| | | | 52/173.3 |
| 2011/0260011 A1 * | 10/2011 | Yu | F16L 3/2235 |
| | | | 248/75 |
| 2013/0200245 A1 | 8/2013 | Markiewicz et al. | |
| 2014/0042286 A1 * | 2/2014 | Jaffari | F16B 2/065 |
| | | | 248/316.4 |
| 2015/0101654 A1 | 4/2015 | Pantel | |
| 2015/0102194 A1 | 4/2015 | Liu | |

FOREIGN PATENT DOCUMENTS

| | | | | |
|---|---|---|---|---|
| FR | 2 019 166 | * | 6/1970 | ............. F16B 13/00 |
| FR | 3025569 A1 | * | 3/2016 | ................ E01F 9/60 |
| GB | 2283552 | | 5/1995 | |

* cited by examiner

APPARATUS FOR SECURING AND COVERING A CLAMPING DEVICE FOR SOLAR PANEL MODULES

FIELD OF THE INVENTION

The present invention relates generally to an apparatus for securing and covering a clamping assembly used to connect and ground multiple objects together. In particular, the clamping assembly is similar to the assemblies that have been disclosed in U.S. Publication 2015/0311606 ("the '606 Publication") that clamp and electrically bonds a solar panel module to a solar panel mounting rail. More specifically, the invention is a sleeve that fits and snaps onto the clamping assembly and enables the assembly to serve as an end clamp in the solar panel array.

BACKGROUND OF INVENTION

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements. This is particularly true when the elements must be installed on a roof that links to a rail guide for supporting the solar panel array.

In a typical support rail guide system, solar panel modules are arranged across the top of several rail guides. This may occur, for example, by using mounting clamps that secure solar panel modules along the top of the rail guide. The rail guides in turn are supported to a roof by flashings.

The clamping devices, like those disclosed in the '606 Publication, which this application incorporates by reference, are examples of clamping assemblies used to secure a solar panel module to the top of a rail guide. These clamping assemblies are typically installed as a mid-clamp within the solar panel array. When positioned along the lower end of the solar panel array, the clamp assembly is exposed and can have an unsightly appearance. The present invention provides a sleeve that fits and snaps onto the clamp assembly and covers the assembly so that the assembly can be used as an end clamp without exposing the parts of the assembly on the lower end of the array. The present invention is also easy to install, use, and manufacture.

SUMMARY OF THE INVENTION

The invention is summarized below only for purposes of introducing embodiments of the invention. The ultimate scope of the invention is to be limited only to the claims that follow the specification.

It is an object of this invention to provide an apparatus for covering a clamp assembly that is used to secure a solar panel module to a rail guide structure.

It is a further object of this invention that the apparatus is a sleeve that fits on an elongated portion of the clamp.

It is a further object of this invention that the apparatus can snap on to the elongated portion of the clamp assembly.

It is a further object of this invention that the clamp provides a cover for the clamp assembly that prevents exposure of the clamp to open view.

It is a further object of this invention that the elongated portion of the clamp assembly is the elongated portion described and illustrated in the '606 Publication.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
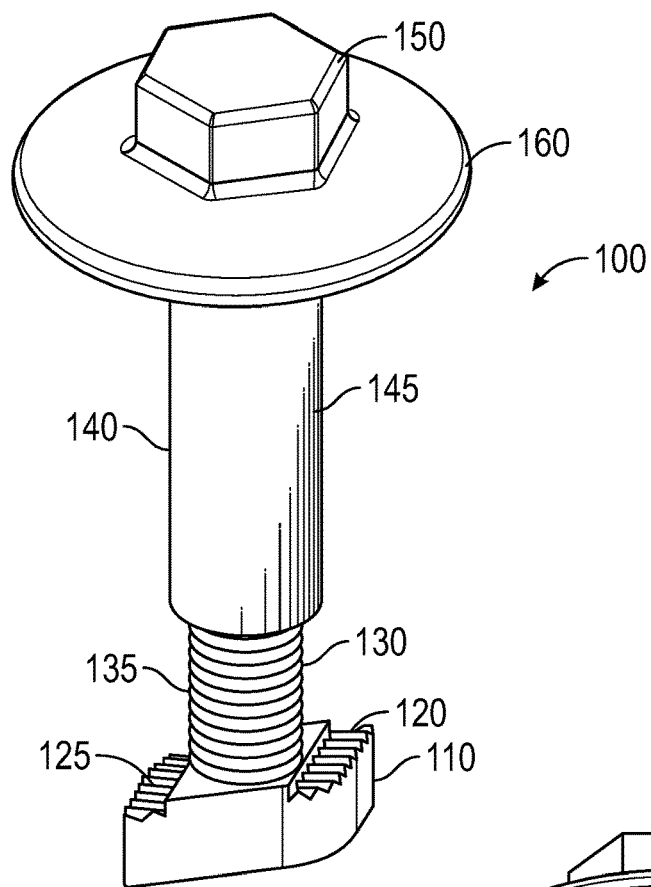
FIG. 1 illustrates a top perspective view of an exemplary clamp assembly.
Figure 2:
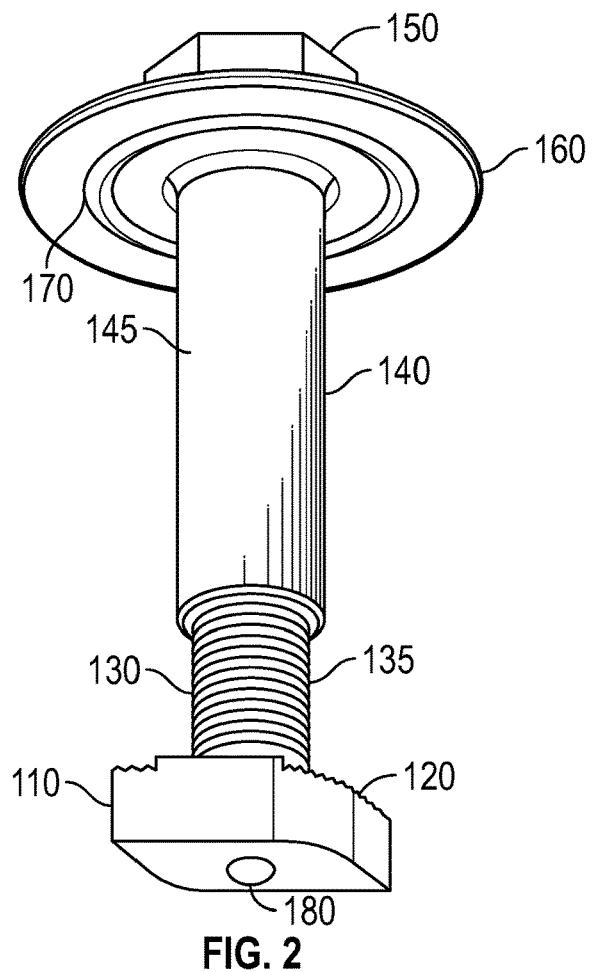
FIG. 2 illustrates a bottom perspective view of the clamp assembly shown in FIG. 1.

FIGS. 1 and 2 show top and bottom perspective views respectively of an exemplary embodiment of a clamp assembly 100. The clamp assembly 100 is the clamp described and disclosed in FIGS. 9-13 of the '606 Publication, although the present invention can also be used with a clamp assembly that utilizes an elongated female member similar to that described below. The clamping assembly 100 includes a male member 130 and an integrated female member 140. The integrated female member 140 is also referred to as a binding bolt and is typically cylindrically shaped. This exemplary clamp assembly in this embodiment is a rounded head mid-clamp clamping assembly 100 defines an integrated structure, such that all the elements of the female member are one piece. Together the members 130 and 140 define a fastener that is used to fix solar panel modules to a mounting rail/racking system.

The male and female members, 130 and 140 are interlocking. The male member has an elongated male element defining a threaded shank 135 and an enlarged end defining a T-bolt end 110. The T-bolt end 110 includes at least one raised portion 120 that is designed for penetrating the surface treatment layer of the solar panel mounting rails and may also include a roller 180. In the embodiment shown, there are a plurality of raised portions 125 defining teeth, which create a pre-determined pattern. The pattern facilitates the penetration of the surface treatment layer of the rails by the male member 130 with only a pressure fit. Additionally, in the embodiment shown, the male member 130 is electrically conductive and made from electrically conductive material.

Likewise, the entire female member 140 is also electrically conductive. The female member 140 defines an integrated member that includes a nut end 150, an annular ring 160 defining a piercing member 170. The nut end 150 is not limited to a conventional hexagonal nut and can comprise any drive type capable of advancing the female member 140 by hand or with a tool such as a torx or allen drive. The female member 140 includes an elongated female element 145 that is generally cylindrical and extends from the nut end 150. Each of the above elements are integrated as if they are a single unit with no movement with respect to one another, but alternatively the elongated female member 145 and the annular ring 160 can be separate elements as long as the annular ring 160 is free to move along the elongated female member 140.

The elongated male element 130 has defines the threaded shank 135. The elongated female element 140 defines a sheath that is a cylindrical member and has internal threads which are functionally compatible with the external threads 135 (also shown in FIG. 10B of the '016 application. Thus, the above-described structure provides an adjustable interlocking fastener assembly for among other things mounting solar panel frames on support rails.

The piercing member 170 includes washer with an annular ring 160 and a center opening. The center opening is sized and shaped to allow the elongated female member 140 passage through the center opening. Additionally, the annular ring 160 has a raised portion for penetrating a metal frame as described above. The raised portion defines the piercing member 170. The piercing member 170 has an edge sharp enough to pierce the surface treatment layer of the solar panel mounting rail as best seen in FIG. 7.

Figure 7:
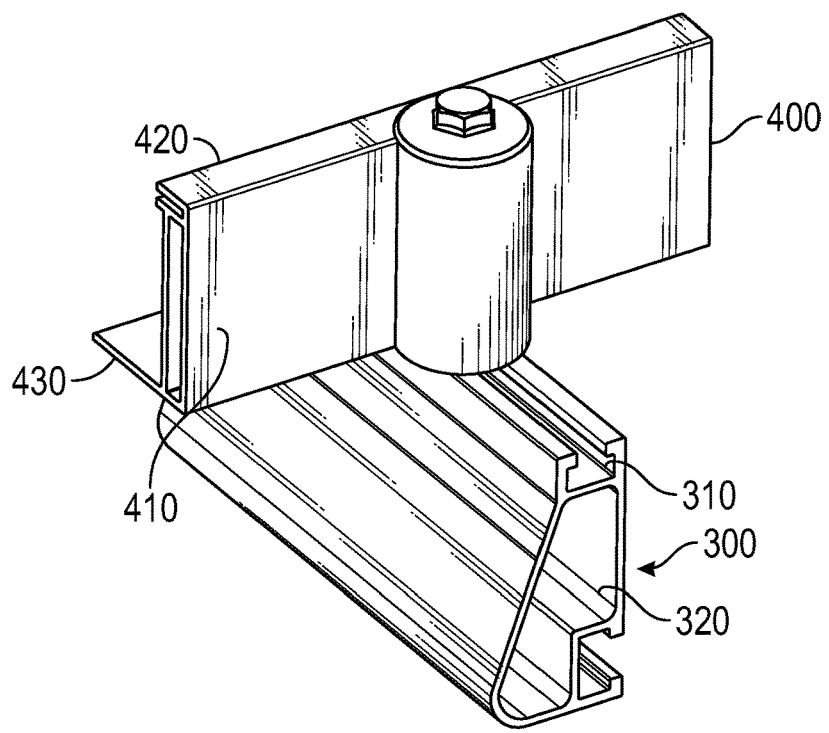
FIG. 7 illustrates a front perspective view of a fully assembled clamp assembly and clamp assembly sleeve in use while securing a solar panel module to a rail guide.

As shown in FIG. 7, the rounded head mid-clamp 100 is used to affix a solar panel frame 400 to a mounting rail 300. The rounded head mid-clamp 100 is typically used to clamp solar panel frames 400 side-by-side and the mounting rail 300 that runs under and perpendicular to the frames 400. The solar panel module includes a rear side 410 and a bottom 430. The male and female members, 130 and 140 respectively, are connected by loosely screwing the members together. The elongated portions 135 and 145 of the male and female portions respectively, thereby form a vertical member, which is vertically aligned with the channel 310 of mounting rail 300. The mounting rail 300 also includes a hollow center 320.

As illustrated, the T-bolt end 110 is adjustable and rotates with respect to the female member 140. After alignment, the female member is pressed against the rear side 410 of the frame 400 with the penetrating member 170 piercing the surface treatment layers of frame 400. The T-bolt end 110 is turned so that it fits within the channel 310. Upon proper placement, so that the T-bolt end 110 fits squarely into the channel, the nut end 150 is tightened. The nut end 150 is tightened until raised portions or teeth 125 pierce the surface treatment layer inside the channel 310. The installer uses one hand to tighten the nut end 150, while the other hand is simply there to guide the fastener so that assembly retains its proper positions. It will be understood that since the female member has already been affixed to the top panel 400 as illustrated, the rounded head mid-clamp 100 can in most instances be installed one-handed.

Figure 3:
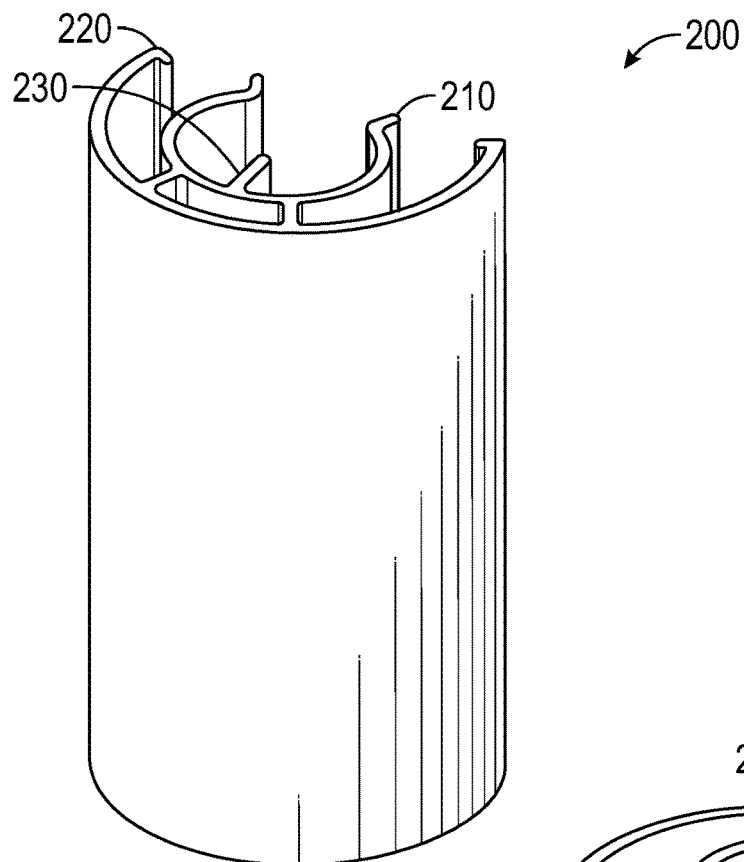
FIG. 3 illustrates a rear perspective view of an exemplary clamp assembly sleeve.
Figure 4:
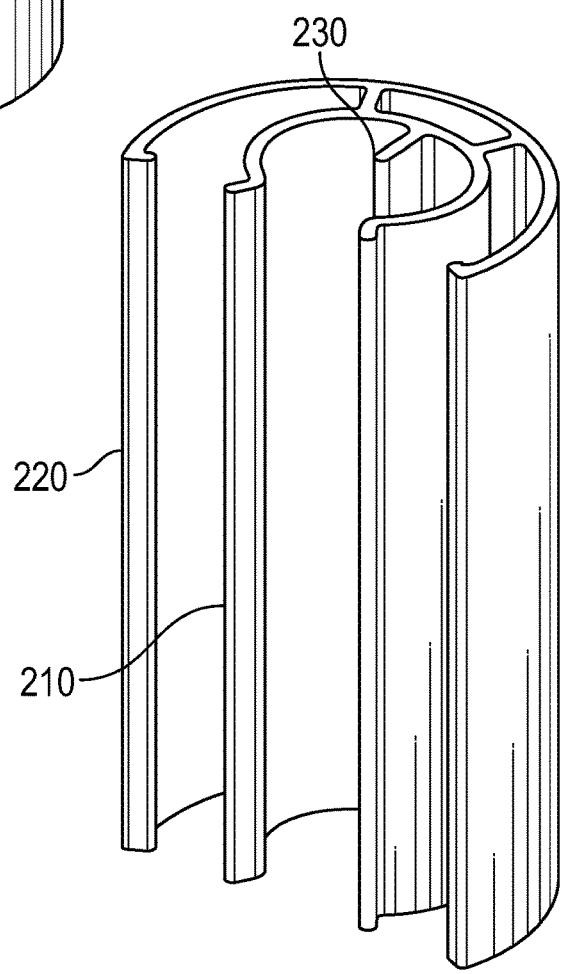
FIG. 4 illustrates a front perspective view of the clamp assembly sleeve in FIG. 3.
Figure 5:
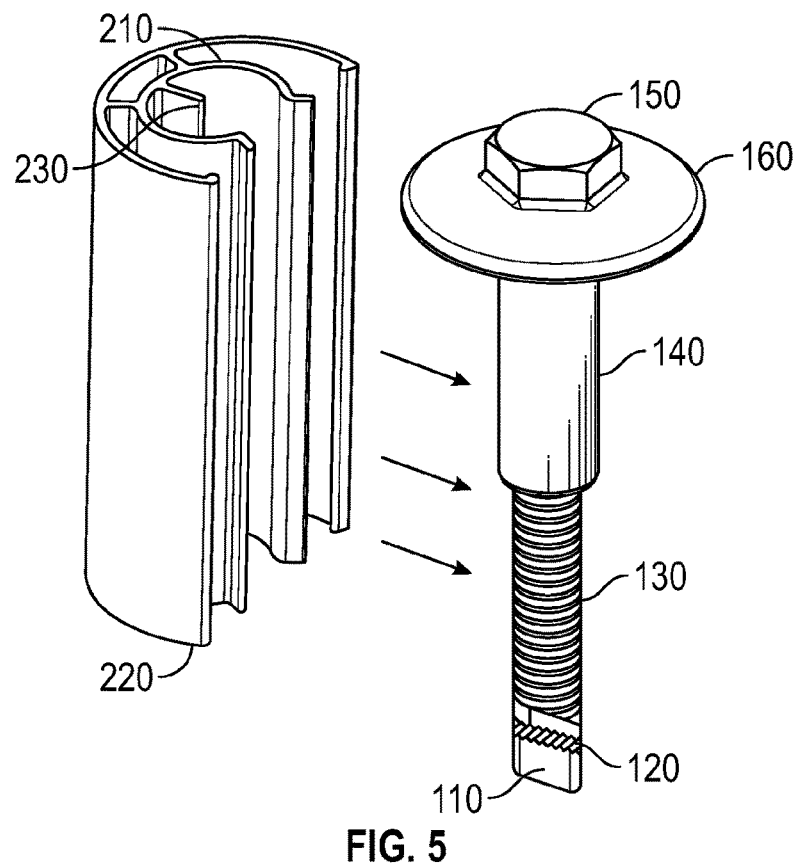
FIG. 5 illustrates a perspective view of a pre-assembled combination of the clamp assembly sleeve and the clamp assembly as shown in FIGS. 1-4.

With particular reference to FIGS. 3 and 4, an exemplary sleeve 200 is shown. The sleeve 200 fits onto the clamp assembly 100 and serves as an end clamp for the clamping assembly 100. The sleeve 100 typically snaps into place over the binding bolt 140 on the clamping assembly 100. An exemplary embodiment of the sleeve 200 includes an outer cover 220 that is typically semi-cylindrical, a connector 210 that is also generally semi-cylindrically shaped, and a rear support 230. The diameter of the outer cover 220 is typically the same as the nut end 150 of the clamp assembly 100, but it could be less if desired. The connector 210 is integrated with the outer cover 220, and in an alternate embodiment, the outer cover 220 could serve as the connector 210 if it is desired that the outer cover 220 does not have to be the same or similar diameter to that of the nut end 150 or annular ring 160 of the nut end 150. In FIGS. 3 and 4, the connector 210 is joined by extensions perpendicularly coupled to the outer cover 220, but it is understood that the connector 210 could be fully integrated with the outer cover 220 as well. The connector 210 is typically made from a resilient material that and, as shown in FIG. 5, engages the binding bolt 140 by snapping in generally perpendicular direction directly over it so that the binding bolt 140 fits within a portion of the connector 210 until it contacts the rear support 230. The rear support 230 extends perpendicularly from the rear of the connector 210. The rear support 230 is optional, but in the present invention utilizes it for tactile feedback to notify the installer that the binding bolt 140 has been fully inserted.

Figure 6A:
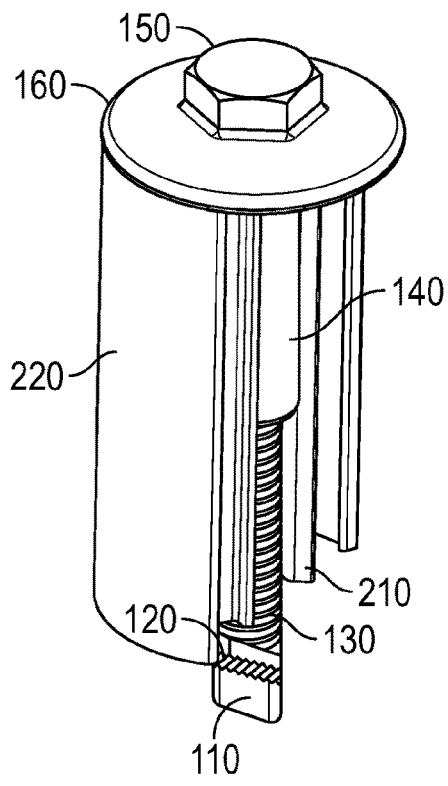
FIGS. 6A and 6B illustrate side and front perspective views of the assembled clamp assembly and clamp assembly sleeve.
Figure 6B:
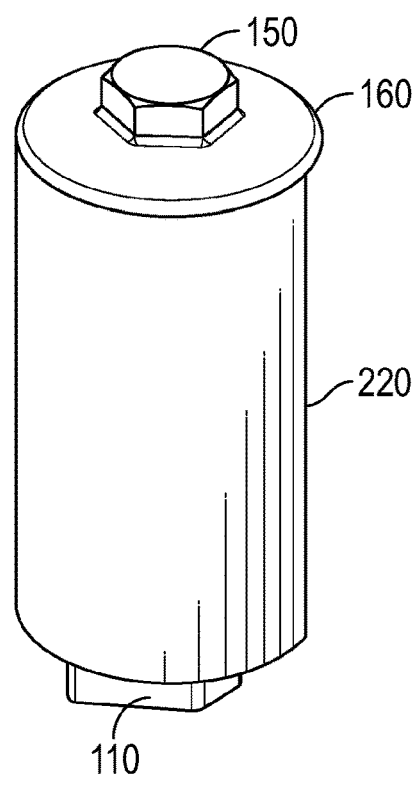

FIGS. 6A and 6B show how the assembled sleeve 200 is connected to the clamp assembly 100. As shown, the sleeve 200 is pushed onto the binding bolt 140 until it snaps securely into place within the connector 210 and reaches the rear support 230. FIG. 7 shows the sleeve 200 when it is connected to the clamp assembly 100 and when the clamp assembly 100 has been used to secure the solar panel module 400 to the mounting rail 300. When fully assembled, the sleeve 200 enables the clamp assembly to act as an end clamp that secures the solar panel module 400 to the mounting rail on the perimeter of the solar panel array and keeps the extended male and female members hidden from view as shown in FIGS. 6B and 7.

Figure 8:
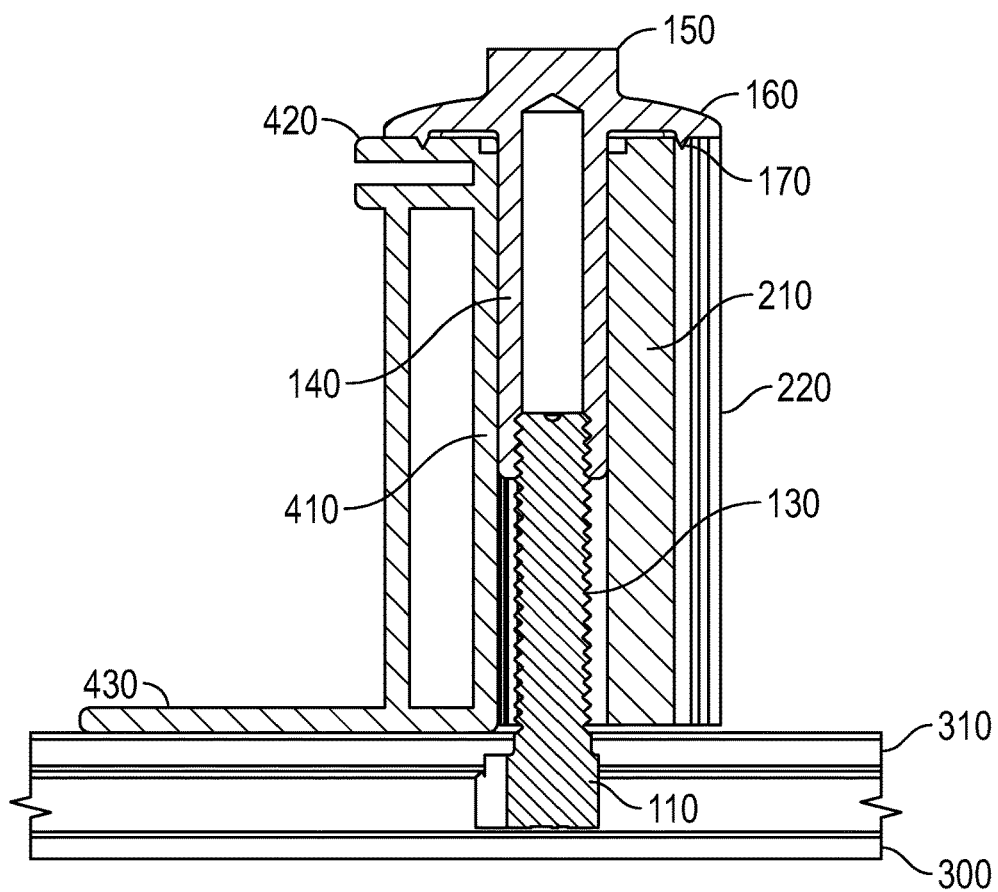
FIG. 8 illustrates a cross-section view of the assembled product shown in FIG. 7.

FIG. 8 shows a cross-sectional view of FIG. 7. The piercing member 170 also penetrates the surface layer of the sleeve 200. By doing so, the sleeve 200 is electrically bonded to the clamp assembly 100, the solar panel module 400, and the mounting rail 300.

What is claimed is:
1. A clamping assembly comprising:
   a. a bolt comprising:
      i. an enlarged end comprising at least one serration on a top surface of the enlarged end configured to penetrate a surface treatment layer of a solar panel rail guide;
      ii. a cylindrical member having a first end and a second end wherein the first end is coupled to the top surface of the enlarged end so that the cylindrical member is perpendicular to the enlarged end;

b. a nut comprising at least one serration on a bottom side of the nut configured to penetrate a surface treatment layer of a support bracket and the nut being coupled to the second end of the cylindrical member through an opening on the bottom side; and
c. the enlarged end is configured for:
i. insertion in a first orientation along a length of the solar panel rail guide;
ii. rotation to a second orientation such that the enlarged end engages the rail support guide;
d. a semi-cylindrical sleeve having an upper end engaging the bottom side of the nut and a lower end configured to engage the solar panel rail guide, wherein the sleeve comprises:
i. a semi-cylindrical outer cover having an open top, an open bottom and a longitudinally-extending sidewall opening extending between an outer surface and an inner surface thereof; and
ii. a semi-cylindrical connector concentrically disposed within the outer cover and radially coupled to the inner surface of the outer cover by a plurality of flanges, the connector comprising an open top, an open bottom and a longitudinally-extending sidewall opening extending between an outer surface and an inner surface thereof and aligned with the sidewall opening of the outer cover, the connector comprised of a resilient material that is configured to snap onto, and secure the connector around a portion of the cylindrical member of the clamping assembly in a direction perpendicular to the cylindrical member.

2. The assembly of claim 1 wherein the connector further comprises a rear support that extends outward from the connector and contacts the cylindrical member when the cylindrical member is coupled to the connector.

3. The assembly of claim 1 wherein the diameter of the outer cover is greater than the diameter of the cylindrical member and less than or equal to the width of the nut.

4. The assembly of claim 1 wherein the nut further comprises a gripping structure on a top side of the nut.

* * * * *